United States Patent
Maj et al.

[11] Patent Number: 5,166,309
[45] Date of Patent: Nov. 24, 1992

[54] BLOCK POLYETHERAMIDES

[75] Inventors: Philippe Maj, Thiberville; Noelle Forichon, Le Neubourg, both of France

[73] Assignee: Elf Atochem S.A., Puteaux, France

[21] Appl. No.: 851,798

[22] Filed: Mar. 16, 1992

[30] Foreign Application Priority Data

Mar. 15, 1991 [FR] France ............... 91 03175

[51] Int. Cl.$^5$ ........................ C08G 63/685
[52] U.S. Cl. .................... 528/272; 528/274; 528/288; 528/292; 528/300; 528/301; 528/302; 528/307; 528/308; 528/332; 528/335; 525/425; 525/432; 525/434; 525/440; 428/357; 428/373; 428/474.4
[58] Field of Search ........... 528/272, 274, 288, 292, 528/300, 301, 302, 307, 308, 332, 335; 525/440, 425, 432, 434; 428/357, 373, 474.4

[56] References Cited

U.S. PATENT DOCUMENTS

| | | | |
|---|---|---|---|
| 4,230,838 | 10/1980 | Foy et al. | 525/408 |
| 4,238,582 | 12/1980 | Deleens et al. | 525/430 |
| 4,252,920 | 2/1981 | Deleens et al. | 525/430 |
| 4,331,786 | 5/1982 | Foy et al. | 525/408 |
| 4,332,920 | 6/1982 | Foy et al. | 525/408 |
| 4,345,064 | 8/1982 | Mumcu | 528/288 |
| 4,349,661 | 9/1982 | Mumcu | 528/288 |
| 4,361,680 | 11/1982 | Borg et al. | 525/420 |
| 4,376,856 | 3/1983 | Tanaka et al. | 528/292 |
| 4,536,563 | 8/1985 | Okitsu et al. | 528/279 |
| 4,578,451 | 3/1986 | Weaver et al. | 528/292 |
| 4,866,127 | 9/1989 | Jacquemin et al. | 525/90 |
| 4,919,997 | 4/1990 | Twilley et al. | 428/227 |
| 4,923,742 | 5/1990 | Killian et al. | 428/283 |
| 4,956,423 | 9/1990 | Lee | 525/432 |
| 4,985,534 | 1/1991 | Heinz et al. | 528/272 |
| 5,069,955 | 12/1991 | Tse et al. | 428/213 |

FOREIGN PATENT DOCUMENTS

| | | |
|---|---|---|
| 0025487 | 3/1981 | European Pat. Off. . |
| 0025828 | 7/1981 | European Pat. Off. . |
| 2273021 | 12/1975 | France . |
| 2378058 | 8/1978 | France . |
| 2401947 | 3/1979 | France . |
| 2470141 | 5/1981 | France . |
| 2555186 | 5/1985 | France . |
| 63048332 | 8/1986 | Japan . |
| 63182343 | 1/1987 | Japan . |
| 2087912A | 6/1982 | United Kingdom . |

Primary Examiner—Morton Foelak
Assistant Examiner—Sam A. Alquah
Attorney, Agent, or Firm—Burns, Doane, Swecker & Mathis

[57] ABSTRACT

Novel block polyetheramides, well adapted for the usual thermoplastic elastomer applications, e.g., as molded or extruded shaped articles, films, sheaths, composites and the like, have the following general formula:

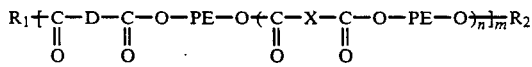

in which D is the residue of an oligoamidediacid having an Mn ranging from 300 to 8,000 and/or the residue of the diacidic polymer chain limiter, PE is the residue of a polyetherdiol having an Mn ranging from 200 to 5,000, X is a linear or branched, (cyclo)aliphatic or aromatic hydrocarbon having form 3 to 20 carbon atoms, $R_1$ and $R_2$, which may be identical or different, are either OH or H, n is a number ranging from 0.1 to 10, and m is an average number ranging from 2 to 50, and are prepared by reacting, in the molten state, an oligoamidediacid A with an oligotherdiol B and a low molecular weight diacidic coupler C, the respective molar percentages a, b and c of which being such that:

$-5 \leq a+c-b \leq 5$ and $c \geq 3$.

15 Claims, No Drawings

BLOCK POLYETHERAMIDES

BACKGROUND OF THE INVENTION

1. Field of the Invention

The present invention relates to novel block polymers comprising polyether blocks and oligoamide blocks, also designated block polyetheramides.

2. Description of the Prior Art

Various block polyetheramides are known to this art.

FR 2,273,021 and FR 2,401,947, assigned to the assignee hereof, describe polyetheramides having the formula:

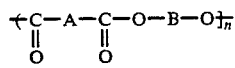

in which A is a polyamide block and B an aliphatic polyether block.

These polymers are prepared by reacting, in molten state, a dicarboxylic polyamide having an Mn ranging from 300 to 15,000 with a polyetherdiol having an Mn ranging from 200 to 6,000 in a high vacuum at temperatures ranging from 100° to 400° C., in the presence of one or more metal tetraalkoxides of the formula $M(OR)_4$ as catalyst, wherein M is titanium, hafnium or zirconium and R is a hydrocarbon radical having from 1 to 24 carbon atoms.

These block polyetheramides exhibit good mechanical and chemical properties.

FR 2,384,810 describes polyetheresteramides prepared by polymerization at autogenous pressure and at temperatures ranging from 230° to 300° C. of a mixture of:

(i) one or more polyamide monomers, (ii) an alpha,omega-dihydroxy(polytetrahydrofuran) or PTMG having an Mn ranging from 160 to 3,000, and (iii) at least one diacid, in the presence of water; the water is then removed from the reaction mixture, which is then returned to normal or reduced pressure at a temperature ranging from 250° to 280° C.

The products obtained are also block polymers and exhibit good impact strength when cold.

However, polymers prepared from the same polyetherdiol as per the above patents have a lower melting temperature than the below described polymers according to the present invention, at the same hardness.

Moreover, the block polyetheramides according to the invention have a lower rigidity at low temperatures than the block polyetheramides of the same melting point and the same Shore D hardness obtained according to the processes described in FR 2,273,021, FR 2,401,947 or FR 2,384,810.

DE 3,428,405 describes polymers which are similar to such prior art polymers, having improved stability to hydrolysis and which are prepared from a stoichiometric mixture of oligoamidediacid and of oligoetherdiol and from 3% to 30 mol % relative to the mixture of diol of low molecular weight.

J63-048,332 describes block polyetheramides based on nylon salts, in which the compatibility between the rigid segments and flexible segments is improved by incorporating aliphatic diacids into the (flexible) polyetherdiols prior to the time the polyetherdiols thus modified are reacted with the oligoamidediacids. With the same polyamide block, the melting point of these polymers decreases with the hardness and the modulus.

Similar polymers are described in J63-227,238 and similar processes in J63-280,736 and J63-105,032.

J63-182,343 describes block polyetheramides prepared by reacting, in the molten state, PA-6,6 blocks having diamine end groups with a polyether having dicarboxylic acid end groups. The melting point of the polymers obtained according to this application varies in the same sense as their flexural modulus and their hardness.

SUMMARY OF THE INVENTION

Accordingly, a major object of the present invention is the provision of novel block polyetheramides whose melting point is independent of the flexural modulus and of the Shore D hardness employing the same polyetherdiol.

Briefly, the present invention features thermoplastic elastomers having the following general formula:

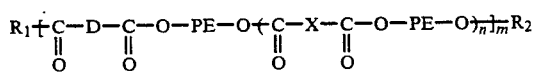

in which D is the residue of an oligoamidediacid having an Mn ranging from 300 to 8,000 and preferably from 500 to 5,000 and/or the residue of the diacidic limiter, PE is the residue of a polyetherdiol having an Mn ranging from 200 to 5,000 and preferably from 200 to 3,000, X is the residue of a diacidic coupler which comprises a linear or branched, (cyclo)aliphatic or aromatic hydrocarbon having from 3 to 20 carbon atoms and preferably from 4 to 12 carbon atoms, $R_1$ and $R_2$ are the polymer chain end groups and may be OH and/or H, n is a number ranging from 0.1 to 10, preferably from 0.2 to 8, and more preferably to from 0.5 to 6, and m is an average number ranging from 2 to 50 and preferably from 5 to 20.

DETAILED DESCRIPTION OF THE PREFERRED EMBODIMENTS OF THE INVENTION

More particularly according to the present invention, the subject block polyetheramides may incorporate blocks D, PE and diacid couplers of different types. Exemplary block polyetheramides include oligoamide blocks comprising, on the one hand, PA-12 (nylon 12) and, on the other, PA-6 (nylon 6) oligomers.

The oligoamidediacids employed may be prepared by polymerization of lactams and/or of amino acids and optionally up to 50% by weight of one or more diacids and of one or more diamines and/or their salts, in the presence of a diacidic polymer chain limiter. The preferred oligoamides are those derived from caprolactam and/or dodecalactam (lauryllactam).

Exemplary diacidic polymer chain limiters include, in particular, adipic and terephthalic acids and, preferably, dodecanedioic acid.

Exemplary polyetherdiols include polyethylene glycol (PEG), polypropylene glycol (PPG), polytetramethylene glycol (PTMG) and mixtures of at least two of such polyetherdiols. PEG and PTMG are particularly preferred.

Exemplary copolyetherdiols include random and/or block copolymers of ethylene glycol and/or of 1,2- or 1,3-propylene glycol and/or of 1,2-, 1,3- or 1,4-butylene glycol.

By "polyetherdiols" are also intended mixtures of polyetherdiols as described above with other diol compounds having an Mn generally ranging from 250 to 4,000 and preferably from 600 to 3,000, such as hydrogenated polyisoprenediol, hydrogenated polybutadienediol or other hydrocarbon diols.

The diacidic couplers having the formula HOOCX-COOH typically have a molecular weight ranging from 100 to 1,000 and are typically selected from among adipic, isophthalic, azelaic, sebacic and 4,4'-diphenyl ether dicarboxylic acids, preferably dodecanedioic acid.

The inherent viscosity of the block polyetheramides according to the invention advantageously ranges from 0.6 to 3.5 dl/g, preferably from 0.8 to 2.5. It is measured at 20° C. in m-cresol at an initial concentration of 0.5 g of polymer per 100 g of m-cresol.

Their number-average molecular weight (Mn) typically ranges from 10,000 to 50,000 and preferably from 15,000 to 30,000.

The block polyetheramides according to the invention may be prepared by reacting, in the molten state, an oligoamidediacid A with an oligoetherdiol B and a diacidic coupler C of low molecular weight, the respective molar percentages a, b and c thereof being such that:

$$-5 \leq a+c-b \leq +5 \text{ and } c \geq 3.$$

The reaction is advantageously carried out in the presence of the diacidic coupler at reduced pressure and in the presence of at least one esterification catalyst such as, for example, aluminum, tin, antimony, germanium, zirconium, titanium and/or hafnium alkoxides, zirconium and titanium tetrabutylates, antimony oxide, tin hydroxyoxide laurate, either alone or in admixture and/or in the presence, particularly, of phosphoric acid.

In one embodiment of the invention, such process entails reacting, in a first step, the oligoamide with all or a portion of the polyether until a predetermined degree of conversion has been attained, before adding the diacidic coupler (and optionally the remaining polyether). The catalyst(s) may be added, preferably, during the first stage of reaction between the oligoamide and the polyether, and the second stage wherein the diacidic coupler is reacted is preferably carried out in the presence of esterification catalyst(s) or of an active residue of the catalyst employed during the first stage.

A second embodiment of the process according to the invention entails preparing, in a first stage, the oligoamidediacid in the presence of all or a portion of the polyether, the second stage then comprising adding the diacidic coupler (and optionally the remainder of the polyether).

In the event of the synthesis of the flexible block polyetheramides, i.e., those in which the molar percentage (c) of the diacidic coupler in relation to all of the constituents is higher than or equal to approximately 26%, it is advantageous to prepare, in an intermediate stage, a triblock diol of the formula:

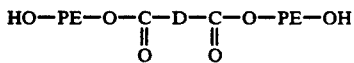

in the presence or absence of catalyst. This triblock (having a degree of conversion ranging from 10% to 100%) is then reacted with the remainder of the polyetherdiol and the diacidic coupler of low molecular weight, typically in the presence of esterification catalyst and at reduced pressure.

The reaction in the melt is typically carried out at a temperature ranging from 150° to 300° C. and preferably from 200° to 270° C.

The block polyetheramides according to the invention may be used as such and are suitable for the production of molded or extruded shaped articles, films, sheathing and composite materials such as multilayer films. They can also be mixed with other polymers and, in particular, with polyamides.

Various block polyetheramides according to the invention exhibit special properties.

Exemplary thereof are the block polyetheramides in which the polyether blocks are predominantly of PEG, which exhibit excellent antistatic and gas-permeability properties, either alone or when mixed with other polymers such as ABS resin, polycarbonate, polyphenylene ether or polyamide.

The preferred antistatic block polyetheramides are those in which the oligoamide blocks are derived from PA-6. The preferred gas-permeable block polyetheramides are those in which the oligoamide blocks are derived from PA-12.

In order to further illustrate the present invention and the advantages thereof, the following specific examples are given, it being understood that same are intended only as illustrative and in nowise limitative.

In said examples to follow, the following characteristics were determined for each of the polymers obtained:

(a) inherent viscosity in solution at a concentration of 0.5 g/dl in m-cresol at 20° C.;

(b) melting temperatures, measured between −30° and +250° C. at 20° C./min on second heating with a Perkin Elmer DSC-4 apparatus;

(c) number-average (Mn) or weight-average (Mw) molecular weights, measured by GPC in benzyl alcohol at 130° C. as polyTHF equivalent.

Examples 1 to 42 were carried out according to the following general procedure:

50 g of the various reactants in selected proportions and the catalyst were introduced into a 300-cm$^3$ glass reactor fitted with a nitrogen inlet, a condenser, an anchor stirrer and a system for reducing pressure. The apparatus was purged with nitrogen and then evacuated (0.05–0.5 mbar). The reactor was immersed in an oil bath at 100° C. and then heated progressively to 240° C. over 30 min. The stirring rate was 60 rev/min at the beginning of heating and then 250 rev/min beginning from 170° C. The temperature was maintained at a plateau at 240° C. throughout the reaction period. The polycondensation effluents were collected in a receiver cooled with liquid nitrogen as they exited the condenser. During the reaction, the stirring rate was progressively reduced to 40 rev/min when the viscosity of the molten mixture increased. The reaction was terminated when the polymer viscosity became too high. At the end of reaction, the vacuum was compensated by nitrogen and the heating and stirring were stopped. The polymer was cooled under nitrogen flushing and was then collected by breaking the tube.

The diacidic couplers employed in the examples were:

(i) dodecanedioic acid (DDA),
(ii) adipic acid (AA),
(iii) azelaic acid (AZ),
(iv) isophthalic acid (IA),
(v) terephthalic acid (TA).

EXAMPLES 1 to 17:

Synthesis of a PTMG/PA-12/PTMG triblock diol of Mn 3,000

8.54 kg of lauryllactam, 1.46 kg of adipic acid and 2.7 l of water were placed in a 100-l stainless steel autoclave fitted with an anchor stirrer. After 5 nitrogen purges between 10 bars and 50 mbar the reactor was closed, the residual pressure being equal to 2 bars of nitrogen. The reactor heating was actuated and the reaction mixture reached 246° C. at a pressure of 37 bars over 135 min, the stirring (50 rev/min) being initiated when the reactor temperature reached 230° C.

After 2 h under these conditions, the mixture was decompressed to atmospheric pressure, the temperature being 240° C. The reactor was then placed under nitrogen flushing and 20 kg of PTMG of Mn 1,000 preheated to 60° C. were introduced. The temperature of the mixture was increased to 247° C. and maintained for 3 h, after which an oligomer was collected in the liquid nitrogen, containing 0.74 meq./g of alcohol functional groups, 0.08 meq./g of acid functional groups, i.e., of Mn 3,000, and having a melting point of 143° C.

Synthesis of the block polyetheramide according to the invention

According to the general procedure described above, 50 g of the reactants (triblock diol, polyetherdiol and diacidic coupler) in the proportions indicated in Table 1 and 0.15 g of catalyst (solution of zirconium tetrabutylate at a concentration of 80% in butanol) were introduced into the reactor. Table 1 reports, for each of the Examples 1 to 17, other than the proportions of the reactants, the duration of reaction at 240° C. and the characteristics of the thermoplastic elastomers (melting points of the polyamide and polyether phases, inherent viscosity, Mn determined by GPC).

The polyetherdiols employed were polytetramethylene glycol (PTMG), polyethylene glycol (PEG) and hydrogenated polyisoprenediol (EPOL) of Mn reported in Table 1.

EXAMPLES 18 to 21

Synthesis of a PTMG/PA-12/PTMG triblock of Mn 4,000

Following the procedure of the preceding examples, 13.9 kg of lauryllactam, 1.1 kg of adipic acid and 2.7 l of water were reacted at 255° C. at autogenous pressure of 33 bars for 3 h, 30 min; the reaction mixture was then adjusted to atmospheric pressure under nitrogen flushing at 240° C. over 90 min. 15 kg of PTMG of Mn 1,000 were then added and the mixture was then heated to 260° C. under nitrogen flushing for 4 h, 30 min. An oligomer was collected in the liquid nitrogen, containing 0.54 meq./g of alcohol functional groups, 0.04 meq./g of acidic functional groups, i.e., of Mn 4,000, and of melting point 161.5° C.

Synthesis of the block polyetheramide according to the invention

The procedure was identical with that for preparing the polymers of Examples 1 to 17, the triblock of Mn 4,000 described above being employed. The characteristics of the polymers obtained and the reaction times are reported in Table 2.

EXAMPLES 22 to 27

The polymers of Examples 22 to 27 were prepared by the procedure of Examples 1 to 17, from 50 g of reactants (diacidic PA-12 limited by adipic (AA), dodecanedioic (DDA) or terephthalic (TA) acid of Mn ranging from 900 to 4,000, PTMG diol of Mn 1,000 and diacidic coupler (DDA) in the proportions reported in Table 3 and 0.15 g of the same catalyst as in Examples 1 to 17.

EXAMPLES 28 to 35

The thermoplastic elastomers of Examples 28 to 35 were prepared by the procedure of Examples 1 to 17 employing DDA-limited PA-12 of Mn 1,000, PTMG diol of Mn 1,000 and dodecanedioic acid (diacidic coupler). The characteristics of the polymers obtained and the reaction times are reported in Table 4.

EXAMPLES 36 to 40

The thermoplastic elastomers of Examples 36 to 40 were prepared by the procedure and in the proportions of Example 4 from a mixture containing 1 mole of triblock diol of Mn 3,000 prepared in Example 1 to 17 per 2 moles of PTMG of Mn 1,000 and 3 moles of diacidic coupler (DDA); their characteristics are reported in Table 5; the catalyst systems used during the synthesis were:
 (i) no catalyst (Example 36, Comparative),
 (ii) 0.3% of antimony oxide $Sb_2O_3$ (Example 37),
 (iii) 0.3% of butyltin hydroxyoxide BuSnO(OH) (Example 38),
 (iv) 0.36% of dibutyltin oxide $(Bu)_2SnO$ (Example 39),
 (v) 0.3% of zirconium tetraacetylacetonate (Example 40).

EXAMPLES 41 and 42

Examples 41 and 42 were carried out according to the procedure of Examples 1 to 17 employing a mixture containing 1 mole of diacidic PA per 4 moles of PTMG 1,000 and 3 moles of DDA with the same catalyst system. The characteristics of the thermoplastic elastomers and the reaction times are reported in Table 6.

EXAMPLE 43 (Comparative)

According to the procedure described in FR 2,401,947, 7.74 kg of caprolactam, 2.4 kg of dodecanedioic acid and 2 l of water were introduced into a 100-l stainless steel reactor fitted with an anchor stirrer. After several nitrogen purges, the mixture was heated to 230° C. at autogenous pressure of 23 bars and maintained under these conditions for 30 min, the stirring being initiated at 200° C.

The pressure was reduced to atmospheric pressure over 90 min and the mixture was placed under nitrogen flushing and 20.9 kg of PTMG of Mn 2,000 were then introduced. The mixture, maintained at 250° C. under a nitrogen stream, was stirred for 3.h and the pressure was then progressively reduced to 50 mbar and the temperature to 230° C. 75 cm³ of a solution of $Zr(OBu)_4$ at a concentration of 80% in butanol were then added. The temperature was then increased to 240° C. and the pressure reduced to 1 mbar. After 3 h of polycondensation under these conditions, the reaction mixture was adjusted to atmospheric pressure by injecting nitrogen into the reactor and 25 kg of a thermoplastic elastomer were collected by extrusion, its characteristics being reported in Table 7.

EXAMPLE 44 (Comparative)

According to the procedure described in FR 2,384,810, 4.7 kg of caprolactam, 4.73 kg of dodecanedioic acid, 20.55 kg of PTMG of Mn 1,000 and 2 l of water were placed in a 100-l stainless steel autoclave fitted with an anchor stirrer. After several purges with nitrogen, the apparatus was heated at autogenous pressure (all valves closed) to a temperature of 250° C. over 2 h, 30 min, the stirring being initiated at 220° C., namely, 1 h, 45 min, after the heating began. The pressure which was established in the reactor was 22 bars and was adjusted over 110 min to atmospheric pressure by progressive decompression, the temperature being decreased to 240° C.

24 g of an aqueous solution of 84% phosphoric acid were then introduced under nitrogen flushing and then, with the valves closed, the pressure inside the reactor was reduced to $5.33 \times 10^3$ Pa over 30 min. The polycondensation was continued under these conditions for 8 h and then for an additional 7 h at a reduced pressure of $1.07 \times 10^3$ Pa. At the end of this period, no appreciable increase in the torque was detected. A thermoplastic elastomer was obtained by extrusion, its characteristics being reported in Table 7.

EXAMPLE 45 (Comparative)

According to the procedure described in J63-280,736, 7.8 kg of caprolactam, 1.2 kg of dodecanedioic acid, 2 l of water and 21 kg of PTMG of Mn 2,000 were introduced into a 100-l stainless steel reactor fitted with an anchor stirrer.

After several nitrogen purges the contents were heated, with all valves closed, to 240° C. over 2 h, the stirring being initiated at 220° C. An autogenous pressure of 17 bars was attained and maintained at the same temperature for 2 h. The decompression to atmospheric pressure was performed over 2 h, 30 min, the temperature being increased to 250° C. Once atmospheric pressure was attained, the mixture was placed under nitrogen flushing and maintained at 250° C. for 3 h.

1.2 kg of dodecanedioic acid were then introduced and the mixture was progressively adjusted over 30 min to a reduced pressure of 40 mbar, the temperature being reduced to 240° C. After 30 min of reaction under these conditions, 100 cm³ of a solution containing 80% of zirconium tetrabutylate were introduced. The pressure was then reduced to 667 Pa and after 15 h of polycondensation under these conditions, a thermoplastic elastomer was obtained, the characteristics of which are reported in Table 7.

EXAMPLE 46 (Comparative)

Following the procedure of Example 45, 5.4 kg of caprolactam, 2.53 kg of dodecanedioic acid, 2 l of water and 22 kg of PTMG of Mn 1,000 were reacted in a first step. The same procedure as in Example 24 was repeated for the synthesis of the triblock.

2.53 kg of dodecanedioic acid were then added, followed by 10 cm³ of a solution containing 80% of zirconium tetrabutylate. After 7 h of polycondensation at 240° C. at a pressure of 399 Pa, a thermoplastic elastomer was obtained, the characteristics of which are reported in Table 7.

EXAMPLE 47

Following the procedure of Example 46, 6.2 kg of caprolactam, 2.3 kg of dodecanedioic acid and 2.7 l of water were reacted at autogenous pressure of 31 bars at 240° C. After 30 min under these conditions and 1 h of decompression to atmospheric pressure, 20 kg of PTMG of Mn 1,000 were added and the reaction mixture was then maintained under nitrogen flushing for 3 h at 240° C.

2.3 kg of dodecanedioic acid were then added and the pressure was reduced to $6.67 \times 10^3$ Pa and maintained for 45 min before 50 cm³ of a solution containing 80% of zirconium tetrabutylate were introduced and the pressure was reduced to 133 Pa. After 8 h 40 min of reaction under these conditions, a thermoplastic elastomer was obtained, the characteristics of which are reported in Table 7.

EXAMPLE 48

4.375 kg of caprolactam, 1.2 kg of dodecanedioic acid, 2 l of water and 10.4 kg of PTMG of Mn 1,000 were introduced into a 100-l stainless steel reactor fitted with an anchor stirrer. After several nitrogen purges, the contents were heated at autogenous pressure to 250° C., with stirring from 200° C. The autogenous pressure of 27 bars was maintained 1 h under these conditions, then reduced over 1 h to atmospheric pressure while the temperature was maintained at 250° C.

After 1 h of reaction under nitrogen flushing, 10.4 kg of PTMG of Mn 1,000 were introduced, followed by 3.6 kg of dodecanedioic acid. The pressure was then reduced to $13.3 \times 10^3$ Pa and maintained for 15 min while the temperature was adjusted to 240° C.

90 cm³ of a solution containing 80% of zirconium tetrabutylate were then introduced, and the pressure was then reduced to 133 pa and, after 3 h, 25 min of reaction under these conditions, a thermoplastic elastomer was obtained, the characteristics of which are reported in Table 7.

EXAMPLE 49

663.6 g of lauryllactam, 86.4 g of dodecanedioic acid and 60 ml of water were introduced into a 5-l steel autoclave. The temperature was increased to 255° C. and the pressure in the autoclave to 33 bars. After 4 h, the pressure was reduced to 1 bar. The reactor was then flushed with nitrogen. 750 g of PTMG diol of Mn 1,000 and 4.5 g of catalyst Zr(OBu)₄ in solution in butanol (concentration 80% by weight) were then added. The mixture was maintained under nitrogen flushing for 4 h, 30 min, at 240° C. The pressure in the reactor was decreased to 520 m bars. 86.4 g of dodecanedioic acid (preferably molten) were then introduced into the reactor. 10 min after this introduction, the pressure in the reactor was reduced to a pressure of 2 to 1 mbars. After 1 h, 30 min, of reaction under these conditions, the reactor was adjusted, with nitrogen, to normal pressure and the polymer was removed from the reactor.

The polymer had an inherent viscosity of 1.5 and a melting point of 160.4° C.

EXAMPLE 50

Operating under the same conditions as in Example 49, the proportions of the compounds used were as reported in Table 8. The modulus is reported in Table 9.

EXAMPLES 51 and 52 (Comparative)

2,401,497 was carried out. The moduli are reported in Table 9.

TABLE 1

Polymers Prepared From One Mole Of PTMG/PA-12/PTMG 1,000/1,000/1,000 Triblock Diol Per n Moles Of Diacidic Coupler And n − 1 Moles Of Oligomerdiol PE2

| Example | PE2 Nature | PE2 Mn g/mol | Coupler n moles | Coupler Nature | PA weight % | Reaction time min. | $\eta i$ dl/g | PA Tm, °C. | PE Tm, °C. | Mn g/mol | a | b | c |
|---|---|---|---|---|---|---|---|---|---|---|---|---|---|
| 1 | PTMG | 650 | 5 | DDA | 15.22 | 37 | 1.44 | 140.6 | 12.7 | 19,200 | 8.33 | 50 | 41.7 |
| 2 | PTMG | 1,000 | 1.2 | DDA | 29.13 | 100 | 1.27 | 138.3 | 0.1 | 16,500 | 22.7 | 50 | 27.3 |
| 3 | PTMG | 1,000 | 2 | DDA | 22.79 | 38 | 1.63 | 139.0 | 5.6 | 21,900 | 16.7 | 50 | 33.3 |
| 4 | PTMG | 1,000 | 3 | DDA | 17.91 | 22 | 1.26 | 139.4 | 11.6 | 17,500 | 12.5 | 50 | 37.5 |
| 5 | PTMG | 1,000 | 4 | DDA | 14.76 | 13 | 1.86 | 140.3 | 13.7 | 25,000 | 10 | 50 | 40 |
| 6 | PTMG | 1,000 | 5 | DDA | 12.54 | 13 | 1.48 | 140.3 | 16.8 | 21,400 | 8.33 | 50 | 41.7 |
| 7 | PTMG | 2,000 | 2 | DDA | 18.56 | 25 | 1.42 | 140.5 | 17.9 | 19,500 | 16.7 | 50 | 33.3 |
| 8 | PTMG | 2,000 | 5 | DDA | 8.35 | 27 | 1.58 | 138.1 | 23.9 | 26,400 | 8.33 | 50 | 41.7 |
| 9 | PTMG | 2,900 | 2 | DDA | 15.90 | 75 | 1.52 | 138.7 | 22.3 | 20,500 | 16.7 | 50 | 33.3 |
| 10 | PTMG | 2,900 | 5 | DDA | 6.42 | 106 | 1.97 | | 26.3 | 28,100 | 8.33 | 50 | 41.7 |
| 11 | PTMG | 1,000 | 3 | AA | 18.39 | 95 | 0.52 | 138.5 | 19.8 | 3,900 | 12.5 | 50 | 37.5 |
| 12 | PTMG | 1,000 | 3 | AA | 18.39 | 130 | 0.89 | 124.9 | 10.9 | 10,500 | 12.5 | 50 | 37.5 |
| 13 | PTMG | 1,000 | 3 | IA | 18.19 | 98 | 0.40 | 141.9 | 20.7 | 2,650 | 12.5 | 50 | 37.5 |
| 14 | PTMG | 1,000 | 3 | AZ | 17.97 | 100 | 1.22 | 138.1 | 11.2 | 18,800 | 12.5 | 50 | 37.5 |
| 15 | PTMG | 1,000 | 3 | TA | 18.19 | 110 | 0.37 | | | 2,540 | 12.5 | 50 | 37.5 |
| 16 | PPG | 1,000 | 3 | DDA | 17.91 | 200 | 1.07 | 130.8 | −5.4 | 15,600 | 12.5 | 50 | 37.5 |
| 17 | EPOL | 2,660 | 3 | DDA | 11.23 | 87 | / | 139.0 | −0.6 | insoluble | 12.5 | 50 | 37.5 |

TABLE 2

Polymers Prepared From One Mole Of PTMG/PA-12/PTMG 1,000/2,000/1,000 Triblock Diol Per n Moles Of Diacidic Coupler And n − 1 Moles Of Oligomerdiol PE2

| Example | PE2 Nature | PE2 Mn g/mol | Coupler n moles | Coupler Nature | PA weight % | Reaction time min. | $\eta i$ dl/g | PA Tm, °C. | PE Tm, °C. | Mn g/mol | a | b | c |
|---|---|---|---|---|---|---|---|---|---|---|---|---|---|
| 18 | PTMG | 1,000 | 2 | DDA | 37.12 | 47 | 0.96 | 156.7 | 5.1 | 12,500 | 16.7 | 50 | 33.3 |
| 19 | PTMG | 2,000 | 2 | DDA | 31.31 | 24 | 1.01 | 158.1 | 26.8 | 13,300 | 16.7 | 50 | 33.3 |
| 20 | PEG | 1,500 | 2 | DDA | 33.96 | 93 | 1.03 | 158.0 | 22.6 | 12,800 | 16.7 | 50 | 33.3 |
| 21 | PEG | 1,500 | 3 | DDA | 26.38 | 120 | 0.99 | 156.2 | 30.3 | 12,600 | 12.5 | 50 | 37.5 |

TABLE 3

Polymers Prepared From One Mole Of Oligoamidediacid PA-12 Per n Moles Of Diacidic Coupler And n + 1 Moles Of PTMG Diol Of Mn 1,000

| Example | PA-12 Mn g/mol | LDC | Coupler n moles | Coupler Nature | PA weight % | Reaction time min. | $\eta i$ dl/g | PA Tm, °C. | PE Tm, °C. | Mn g/mol | a | b | c |
|---|---|---|---|---|---|---|---|---|---|---|---|---|---|
| 22 | 1,070 | AA | 2 | DDA | 24.19 | 20 | 1.28 | 144.2 | 9.2 | 19,900 | 16.7 | 50 | 33.3 |
| 23 | 1,070 | AA | 5 | DDA | 13.37 | 21 | 1.39 | 140.6 | 16.9 | 17,000 | 8.33 | 50 | 41.7 |
| 24 | 4,000 | AA | 2.5 | DDA | 50.32 | 47 | 1.06 | 169.3 | 24.6 | 10,400 | 14.3 | 50 | 35.7 |
| 25 | 1,005 | DDA | 2 | DDA | 23.06 | 20 | 1.49 | 149.0 | 7.1 | 21,500 | 16.7 | 50 | 33.3 |
| 26 | 1,005 | DDA | 5 | DDA | 12.66 | 20 | 0.99 | 146.8 | 18.3 | 13,000 | 8.33 | 50 | 41.7 |
| 27 | 930 | TA | 2 | DDA | 21.72 | 123 | 1.32 | 141.9 | 7.8 | 19,300 | 16.7 | 50 | 33.3 |

The proportions of the compounds used were as reported in Table 8. The process described in FR

TABLE 4

Polymers Prepared From One Mole Of PA-12 Of Mn 1,005 Per n Moles Of DDA Coupler And n + 1 Moles of PTMG Of Mn 1,000

| Example | Coupler n mol | Coupler Nature | PA weight fraction % | Reaction time at 240° C. min | $\eta i$ dl/g | PA Tm °C. | PE Tm °C. | Mn g/mol | a | b | c |
|---|---|---|---|---|---|---|---|---|---|---|---|
| 28 | 0.2 | DDA | 45.52 | 23 | 1.35 | 151.0 | −12.9 | 13,800 | 41.7 | 50 | 8.33 |
| 29 | 0.5 | | 39.16 | 13 | 1.15 | 150.7 | −7.3 | 18,100 | 33.3 | 50 | 16.7 |
| 30 | 0.8 | | 34.37 | 29 | 1.00 | 149.7 | 1.2 | 13,600 | 27.8 | 50 | 22.2 |
| 31 | 1.2 | | 29.54 | 26 | 1.37 | 150.2 | 1.6 | 17,500 | 22.7 | 50 | 27.3 |
| 32 | 2 | | 23.06 | 20 | 1.49 | 149.0 | 7.1 | 21,500 | 16.7 | 50 | 33.3 |
| 33 | 3 | | 18.10 | 37 | 1.12 | 146.8 | 13.0 | 15,000 | 12.5 | 50 | 37.5 |
| 34 | 4 | | 14.90 | 29 | 1.33 | 148.2 | 15.2 | 20,000 | 10 | 50 | 40 |
| 35 | 5 | | 12.66 | 20 | 0.99 | 146.8 | 18.3 | 13,000 | 8.33 | 50 | 41.7 |

TABLE 5

Use Of Other Catalysts For A Polymer Prepared From One Mole Of Triblock Diol Of Mn 3,000 Per Two Moles Of PTMG 1,000 And Three Moles Of DDA

| Example | Catalyst Nature | qty weight % | Reaction time at 240° C. min | $\eta i$ dl/g | FINAL POLYMER PA Tm °C. | PE Tm °C. | Mn g/mol |
|---|---|---|---|---|---|---|---|
| 36 | / | 0 | 180 | 0.35 | / | 27.1 | 2,530 |
| 37 | $Sb_2O_3$ | 0.3 | 47 | 1.04 | 135.2 | 15.4 | 12,800 |
| 38 | BuSnOHO | 0.3 | 23 | 1.03 | 143.4 | 11.7 | 11,800 |
| 39 | $(Bu)_2SnO$ | 0.36 | 70 | 0.99 | 139.3 | 13.2 | 10,900 |
| 40 | $(AcAc)_4Zr$ | 0.3 | 40 | 1.04 | 141.2 | 13.5 | 13,200 |

TABLE 6

Polymers Prepared From One Mole Of PA Diacid Per Four Moles Of PTMG Diol Of Mn 1,000 And Three Moles Of DDA Diacidic Coupler

| Example | PA diCOOH Nature | Mn g/mol | PA weight fraction % | Reaction time at 240° C. min | $\eta i$ dl/g | Final polymer PA Tm °C. | PE Tm °C. | Mn g/mol |
|---|---|---|---|---|---|---|---|---|
| 41 | 11 | 750 | 14.16 | 24 | 1.10 | 139.4 | 18.8 | 14,800 |
| 42 | 6 | 1,060 | 18.91 | 95 | 1.16 | 186.9 | 21.8 | 14,800 |

TABLE 7

| Example | $\eta i$, dl/g | Mw | PA Tm °C. | PE Tm °C. | Shore A at 5 s | PA, weight % |
|---|---|---|---|---|---|---|
| 43 | 1.2 | 25,200 | 192 | 27 | 84 | 32.7 |
| 44 | 1.08 | 23,000 | (*) | 24 | not measured | 31.5 |
| 45 | 1.35 | 29,400 | 197 | 29 | 68 | 28.8 |
| 46 | 1.78 | 47,400 | (*) | 16 | 57 | 24.4 |
| 47 | 1.82 | 47,300 | (*) | 6 | 72 | 28.4 |
| 48 | 1.73 | 36,800 | 195 | 18 | 55 | 18.6 |

(*): no melting point detectible by DSC

TABLE 8

| Composition % by weight | Example 50 | Example 51 | Example 52 |
|---|---|---|---|
| PA Diacid Oligomer | | | |
| Lactam 12 | 44.7 | 42.7 | 46.35 |
| Adipic acid | 3.5 | 7.3 | 3.65 |
| (PA diacid oligomer Mn) | (2000) | (1000) | (2000) |
| Polyether diol oligomer | | | |
| PTMG | 48.3 | 50 | 50 |
| (Polyether diol oligomer Mn) | (1000) | (1000) | (2000) |
| Diacidic Coupler | | | |
| Adipic acid | 3.5 | 0 | 0 |
| Melting point °C. | 155° C. | 147° C. | 160° C. |

TABLE 9

| Temperature (°C.) | Example 50 (Mpa) | Example 51 (Mpa) | Example 52 (Mpa) |
|---|---|---|---|
| −80 | 3000 | 2500 | 3200 |
| −60 | 1300 | 1100 | 1500 |
| −40 | 500 | 500 | 800 |
| −20 | 220 | 220 | 500 |
| 0 | 130 | 150 | 300 |
| +20 | 120 | 120 | 130 |
| +40 | 100 | 110 | 100 |

The moduli were measured by dynamic analysis (apparatus: RSA2 Rheometric Solid Analyzer) at a pulse rate of 10 radian/s. The test sample was an IFC test sample and the modulus was measured by "Oval Cantilever".

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A block polyetheramide having the following general formula:

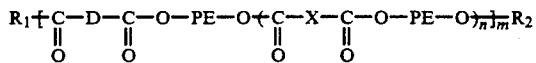

in which D is the residue of an oligoamidediacid having an Mn ranging from 300 to 8,000 and/or the residue of the diacidic polymer chain limiter, PE is the residue of a polyetherdiol having an Mn ranging from 200 to 5,000, X is a linear or branched, (cyclo)aliphatic or aromatic hydrocarbon having from 3 to 20 carbon atoms, $R_1$ and $R_2$, which may be identical or different, are either OH or H, n is a number ranging from 0.1 to 10, and m is an average number ranging from 2 to 50.

2. The block polyetheramide as defined by claim 1, wherein D has an Mn ranging from 500 to 5,000, PE has an Mn ranging from 200 to 3,000, X has from 4 to 12 carbon atoms, n ranges from 0.2 to 8 and m ranges from 5 to 20.

3. The block polyetheramide as defined by claim 2, wherein n ranges from 0.5 to 6.

4. The block polyetheramide as defined by claim 1, said oligoamidediacid D comprising the polymerizate of a lactam and/or an amino acid and, optionally, up to 50% by weight of at least one diacid and at least one diamine in the presence of a diacidic polymer chain limiter or salt thereof.

5. The block polyetheramide as defined by claim 1, said polyetherdiol comprising PEG and/or PPG and/or PTMG and/or random and/or block copolymers of ethylene glycol and/or of 1,2- or 1,3-propylene glycol and/or of 1,2-, 1,3- or 1,4-butylene glycol, or a mixture of a polyetherdiol with another diol compound having an Mn ranging from 250 to 4,000.

6. The block polyetheramide as defined by claim 1, wherein X is the residue of a diacidic coupler of the formula HOOCXCOOH having an Mn ranging from 100 to 1,000 and comprising adipic, isophthalic, azelaic, sebacic, 4,4'-diphenyl ether dicarboxylic acid or dodecanedioic acid.

7. The block polyetheramide as defined by claim 1, having an inherent viscosity ranging from 0.6 to 3.5 dl/g.

8. The block polyetheramide as defined by claim 7, having an inherent viscosity ranging from 0.8 to 2.5 dl/g.

9. A process for the preparation of a block polyetheramide having the following general formula:

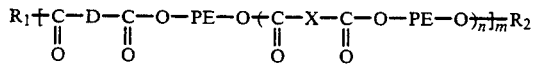

in which D is the residue of an oligoamidediacid having an Mn ranging from 300 to 8,000 and/or the residue of the diacidic polymer chain limiter, PE is the residue of a polyetherdiol having an Mn ranging from 200 to 5,000, X is a linear or branched, (cyclo)aliphatic or aromatic hydrocarbon having from 3 to 20 carbon atoms, $R_1$ and $R_2$, which may be identical or different, are either OH or H, n is a number ranging from 0.1 to 10, and m is an average number ranging from 2 to 50, comprising reacting, in molten state, at least one oligoamidediacid A with at least one oligoetherdiol B and at least one diacidic coupler C of low molecular weight, the respective molar percentages a, b and c thereof being such that:

$-5 \leq a+c-b \leq 5$ and $c \geq 3$.

10. The process as defined by claim 9, comprising, in a first stage, reacting the oligoamide and all or a portion of the oligoether, and thereafter reacting the diacidic coupler and, optionally, the remainder of the oligoether with the oligomer thus formed.

11. The process as defined by claim 9, comprising, in a first stage, preparing the oligoamide in the presence of all or a portion of the oligoether and then, in a second stage, reacting the diacidic coupler and, optionally, the remainder of the oligoether with the oligomer thus formed.

12. The process as defined by claim 11, comprising conducting said first stage in the presence of at least one esterification catalyst.

13. A process for the preparation of a flexible block polyetheramide having the following general formula:

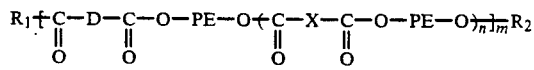

in which D is the residue of an oligoamidediacid having an Mn ranging from 300 to 8,000 and/or the residue of the diacidic polymer chain limiter, PE is the residue of a polyetherdiol having an Mn ranging from 200 to 5,000, X is a linear or branched, (cyclo)aliphatic or aromatic hydrocarbon having from 3 to 20 carbon atoms, $R_1$ and $R_2$, which may be identical or different, are either OH or H, n is a number ranging from 0.1 to 10, and m is an average number ranging from 2 to 50, comprising reacting a triblock diol of the formula:

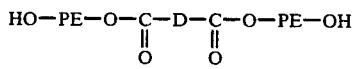

with said polyetherdiol and a diacidic coupler.

14. A shaped article comprising the block polyetheramide as defined by claim 1.

15. The shaped article as defined by claim 14, comprising an extrudate, molded article, film, sheath or composite.

* * * * *